US006539603B1

(12) United States Patent
Bülow

(10) Patent No.: US 6,539,603 B1
(45) Date of Patent: Apr. 1, 2003

(54) METHOD FOR SELF-PROGRAMMING A POWER NUTRUNNER CONTROL SYSTEM DURING INITIAL TIGHTENING PROCESSES

(75) Inventor: Christer Sten-Sture Bülow, Stockholm (SE)

(73) Assignee: Atlas Copco Tools AB, Nacka (SE)

( * ) Notice: Subject to any disclaimer, the term of this patent is extended or adjusted under 35 U.S.C. 154(b) by 0 days.

(21) Appl. No.: 09/646,426

(22) PCT Filed: Mar. 12, 1999

(86) PCT No.: PCT/SE99/00380

§ 371 (c)(1),
(2), (4) Date: Dec. 4, 2000

(87) PCT Pub. No.: WO99/47310

PCT Pub. Date: Sep. 23, 1999

(30) Foreign Application Priority Data

Mar. 19, 1998 (SE) ............................................... 9800915

(51) Int. Cl.[7] ............................................... B23Q 17/00
(52) U.S. Cl. ............................... 29/407.01; 29/407.02; 29/407.03; 29/407.05; 29/709; 73/862.21; 173/6; 173/180
(58) Field of Search ......................... 29/407.01, 407.02, 29/407.03, 407.05, 446, 525.11, 709, 714, 718; 73/761, 862.21; 173/5, 6, 176, 180, 181

(56) References Cited

U.S. PATENT DOCUMENTS

| 4,102,182 A | * | 7/1978 | Brown et al. ................. 73/761 |
|---|---|---|---|
| 4,235,006 A | * | 11/1980 | Eshghy ......................... 29/240 |
| 4,361,945 A | * | 12/1982 | Eshghy ......................... 29/240 |
| 4,620,450 A | * | 11/1986 | Yamaguchi ................... 29/240 |
| 5,062,491 A | * | 11/1991 | Takeshima et al. .......... 173/181 |
| 5,117,919 A | * | 6/1992 | Borries et al. .................. 173/1 |
| 5,203,242 A | * | 4/1993 | Hansson ....................... 81/469 |
| 5,229,931 A | * | 7/1993 | Takeshima et al. ............ 700/4 |
| 5,245,747 A | * | 9/1993 | Hansson ....................... 29/709 |
| 5,404,643 A | * | 4/1995 | Rice ......................... 29/898.09 |
| 5,591,919 A | * | 1/1997 | Hathaway et al. ............. 73/761 |
| 5,637,968 A |  | 6/1997 | Kainec et al. |
| 5,650,574 A | * | 7/1997 | Sato et al. ................ 73/862.23 |

FOREIGN PATENT DOCUMENTS

EP        0753377 A       1/1997

* cited by examiner

Primary Examiner—Gregory M. Vidovich
Assistant Examiner—Jermie E. Cozart
(74) Attorney, Agent, or Firm—Frishauf, Holtz, Goodman & Chick, P.C.

(57) ABSTRACT

A method for self-programming a computerized power nutrunner control system for tightening a number of similar screw joints to a desired final torque level ($M_F$) is provided. The method includes the steps of: (i) tightening initially at a low speed one of the screw joints up to the final torque level ($M_F$), while detecting and analyzing one or more screw joint characteristics, (ii) adjusting successively during a number of succeeding tightening processes one or more nutrunner operating parameters with respect to the detected and analyzed screw joint characteristics, and (iii) locking the self-programming after the nutrunner operating parameters have been adjusted to accomplish a safe tightening of respective following ones of the screw joints to the final torque level ($M_F$) at a satisfactory short time interval.

21 Claims, 2 Drawing Sheets

METHOD FOR SELF-PROGRAMMING A POWER NUTRUNNER CONTROL SYSTEM DURING INITIAL TIGHTENING PROCESSES

BACKGROUND OF THE INVENTION

This invention concerns a method for self-programming a computerized control system for a power nutrunner.

The object of the invention is to provide a self-programming method for a power nutrunner control system, whereby the efficiency of the nutrunner operation is increased by decreasing the cycle time without increasing the risk for torque overshoot at tightening of so called stiff screw joints, i.e. screw joints having a steep torque growth per angle unit of rotation.

The invention relates primarily to the two-step type of tightening process which comprises a high speed first step and a low speed second step. The two steps are divided either by just a speed change or by an intermediate standstill. The first step is always the most time consuming part of the process, because it contains the relatively long running down or nut setting phase, Therefore, to bring down the time spent on the first tightening step, the rotation speed of the fist step has always been kept at a high level in prior art methods.

To safely avoid overtightening of stiff screw joints, however, the speed change point, i.e. where the first high speed step is succeeded by the second low speed step, has been set at a low torque level. The reason is that the kinetic energy or the rotating parts of the nutrunner should be prevented from having any influence on the end result, even in cases of a very steep torque growth characteristic of the screw joint.

This means on the other hand that when tightening screw joints having a very slow torque growth characteristic, this low level down shift point results in an unnecessary long and time consuming low speed second step.

The above described type of two-step tightening is commonly used, and by shifting down to the low speed second step at an early low torque point the method is safely applicable on all types of screw joints In order to speed up the process, the shift down point as well as the individual speed levels may be adjusted in relation to the characteristics of one specific type of screw joint. if, however, the system with this specific setting is used on another type of screw joint having a steeper torque growth characteristic, there is a great risk for getting an undesirable torque overshoot.

In U.S. Pat. No. 5,245,747, there is described a two-step screw joint tightening method by which the risk for overtightening is avoided by stopping the first high speed step at a very low torque level and carrying out the second step at a successively increasing speed. Thereby, the rotation speed in the second step is still low when reaching the intended final pretension level at a stiff screw joint, and this low kinetic energy in the nutruner parts does not cause any dynamic torque overshoot. A drawback with this prior art method, however, is an undesirably slow and time consuming second step when tightening weak screw joints.

In U.S. Pat. No. 5,117,919, there is described a self-adjustable nutrunner control system by which the shut-off point for the nutrunner is automatically adjusted in view of the result of preceding tightening processes. This method, however, does not comprise any detection and calculation of the actual screw joint characteristics during tightening, and the described process is performed in a single step only.

Neither is there anything disclosed in this reference about how to decrease the cycle time by adjusting successively one or more nutruner operation parameters in response to empirically determined and calculated screw joint characteristics during a number of initial tightening processes.

OBJECTS OF THE INVENTION

The main object of the invention is to provide a method for self-programming a nutrunner control system during one or more initial complete tightening processes, for obtaining automatically and without any programming expertise an optimum setting of the nutrunner operating parameters for the most time efficient tightening process, irrespective of the torque growth characteristics of the actual screw joint.

A further object of the invention is to provide a method for self-programming a nutrunner control system by detecting and calculating during one or more initial complete tightening process one or more screw joint characteristics, and by adjusting successively during a succeeding number of tightening processes one or more operating parameters of the nutrunner until the tightening process is performed at a satisfactory time efficiency.

A still further object of the invention is to provide a self-programming method for a nutrunner control system intended for performing a two-step tightening process, wherein during one or more initial tightening processes one or more screw Joint characteristics are detected and calculated, and during a succeeding number of tightening processes one or more nutrunner operating parameters are successively adjusted in order to adapt the speed shift point between the high speed of the first step and the low speed of the second step, thereby extending the first step to a certain point which differs from the point corresponding to the predetermined final pretension level of the screw joint by a certain amount.

Further objects, characteristics and advantages of the method according to the invention will appear from the following specification and claims.

BRIEF DESCRIPTION OF THE DRAWINGS

The invention is below described in further detail with reference to the accompanying drawings in which.

DETAILED DESCRIPTION

Figure 1:
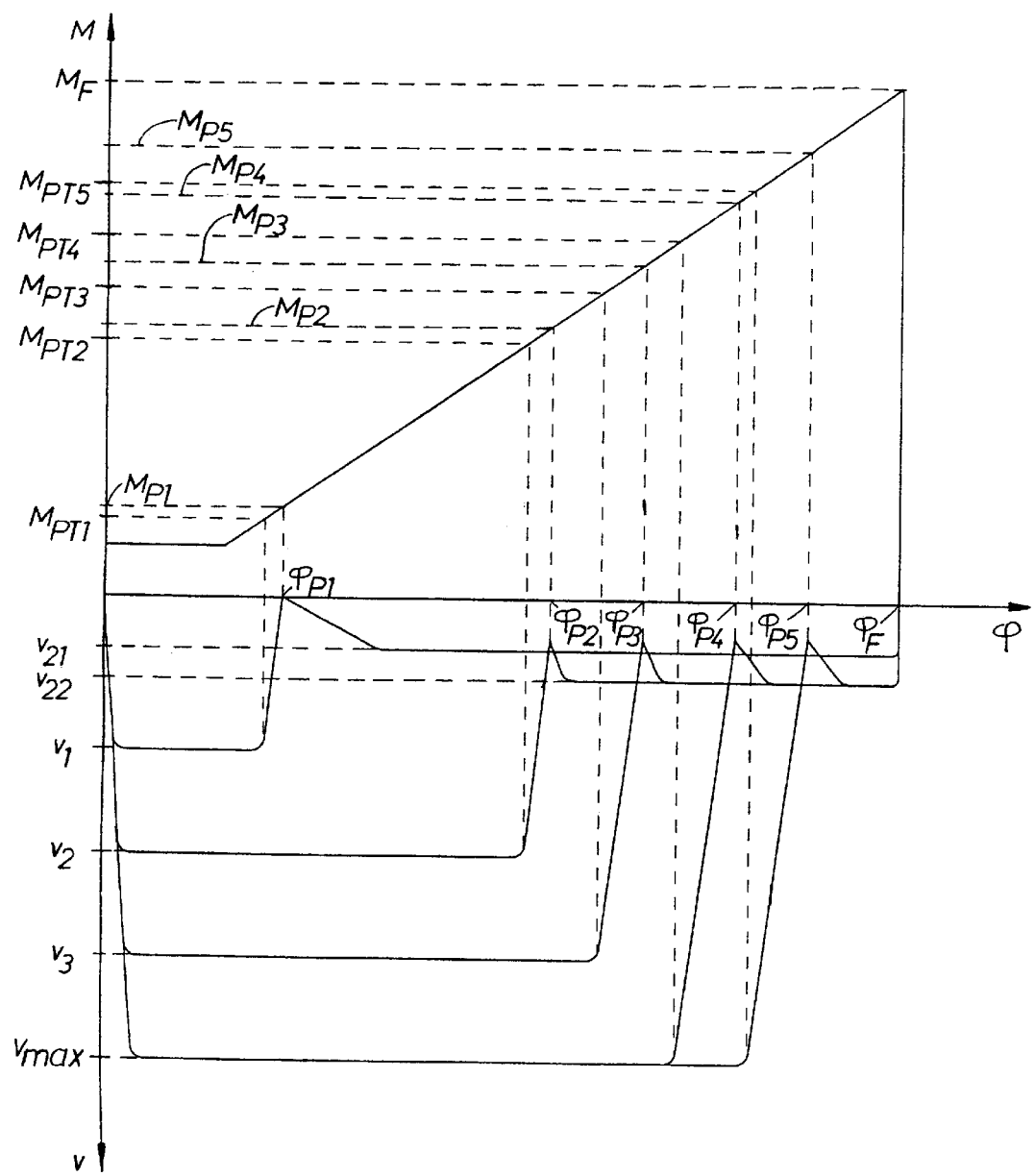
FIG. 1 shows a diagram illustrating the torque/angle characteristic of a relatively soft type of screw joint, as well as the rotation speed at different programming stages.

The relatively soft type of screw joint illustrated in FIG. 1 is intended to be pretensioned to a final torque level $M_F$. This torque level is used as the end target for the tightening processes to be performed at this type of screw joint.

The self-programming tightening process according to the invention comprises a few initial tightening processes each of which is a complete tightening process pretensing the actual screw joint to the intended pretension level. This means that the method according to the invention may be carried out in a regular production work, i.e. no special programming operations have to be carried out.

As stated above, the main object of the invention is to accomplish a screw joint tightening process by which the joints are tightened to a desired final pretension level in an optimum time interval, i.e. as quick as possible, without risking overtightening of the joints. This means that the process has to be carefully adapted to the specific characteristics of the actual type of screw joint. This means that a few initial tightening processes are carried out during which the system is "learning" the characteristics of the joint. In particular, the system is programmed with the torque rate of the joint, i.e. the torque growth per angle of rotation. Also variations in the frictional resistance of the joint is registered. All this information is of great importance for avoiding overtightening when trying to speed up the process.

As mentioned in the first part of this specification, the only way to speed up the process is to extend the first high speed step as long as possible and to complete the process with a short low speed second step. Preferably, the first tightening step should be extended to point in which the angular position of the joint is 50–80% of the angular position when reaching the final pretension level. In order to accomplish this, the preliminary target for interrupting the first tightening step and the rotation speed during the first step is initially set at a very low level.

For obtaining the relevant information of the screw joint, the very first tightening process is performed at a low speed, during the first step as well as the second step.

In order to find a suitable preliminary target torque by which the rotation during the first step should be interrupted, there are at least two possible ways to proceed. One way is to step up the speed during the first tightening step while aiming at the same preliminary target torque $M_{PT1}$ and to indicate what the installed preliminary torque level will be, and, thereafter, when the maximum speed $v_{max}$ of the system is reached the target torque level $M_{PT}$ could be stepped up as well.

However, these two ways of adapting the down shift point to the characteristic of the actual type joint could be combined. This means that after the very first screw joint analysing low speed process, the speed of the first step is step-wise increased simultaneously with a step-wise increase of the preliminary target torque level $M_{PT}$. This combined adapting process is quicker and is initiated automatically by the control system when the screw joint characteristic is very soft.

As illustrated in FIG. 1, the programming of the process control system is carried out in two subsequent steps, starting with a first running down step at a speed $v_1$. This step is interrupted at a preliminary target torque level $M_{PT1}$. Due to the kinetic energy stored in the rotating parts of the power tool used for this operation, the preliminary target torque is superseded by a certain amount and the resultant installed torque is a preliminary torque $M_{P1}$.

The process is continued by a second step carried out at a very low speed $v_{21}$ until the final desired torque level $M_F$ is reached. At that point the angular position of the screw joint is $\Phi_F$. It is clearly illustrated, that this first tightening process is extremely slow, because not only the speed levels are low per se, but the shift down point from the first step to the even slower second step takes place very early, which means that the very slow second step becomes very long, from a point $\Phi_{P1}$ to the final angular position $\Phi_F$.

After this first process, the speed of the first tightening step is increased to $v_2$ whereby at the same time, the target torque level is increased from $M_{PT1}$ to $M_{PT2}$. The resultant installed torque then becomes $M_{P2}$ and the angular position of the joint at the end of the first tightening step is $\Phi_{P2}$. The angular distance to the aimed final position $\Phi_F$ is still far too long. The following slow second step is still too long and the cycle time for the entire process is too long. The rotation speed during the second step is increased to $v_{22}$, though, which reduces the cycle time to some extent.

Accordingly, the first step speed is increased to $v_3$ and the preliminary target torque level is increased to $M_{PT3}$. As the joint stops after power interruption at $M_{PT3}$, the installed torque is $M_{P3}$ and the resultant angular position of the joint is $\Phi_{P3}$. Still, the second step is too long, In the next programming step, the rotation speed during the first tightening step is increased to the maximum capacity of the system $v_{max}$ and the preliminary target is increased to $M_{PT4}$. The angular distance from the resultant position $\Phi_{P4}$ after the first tightening step to the aimed end position $\Phi_F$ as calculated is still too long.

Since the maximum speed $v_{max}$ of the system is reached already, the last measure to obtain a satisfactory programming of the control system is to increase the preliminary target torque level to $M_{PT5}$. Now, the resultant installed torque becomes $M_{P5}$, and the angular position of the down shift point between the first step and the second step becomes $\Phi_{P5}$. The distance between this point and the aimed final position $\Phi_F$ is satisfactory short to result in an optimum, cycle time without risking overshoot in the applied pretension torque. This means that the obtained angular position $\Phi_{P5}$ differs from the aimed final position $\Phi_F$ by less than 20–50%.

It is also possible to use the installed torque $M_P$ as reference criteria when determining a satisfactory end status of the first tightening step. Accordingly, the installed torque $M_P$ should amount to a 50–80% fraction of the desired final torque $M_F$.

Figure 2:
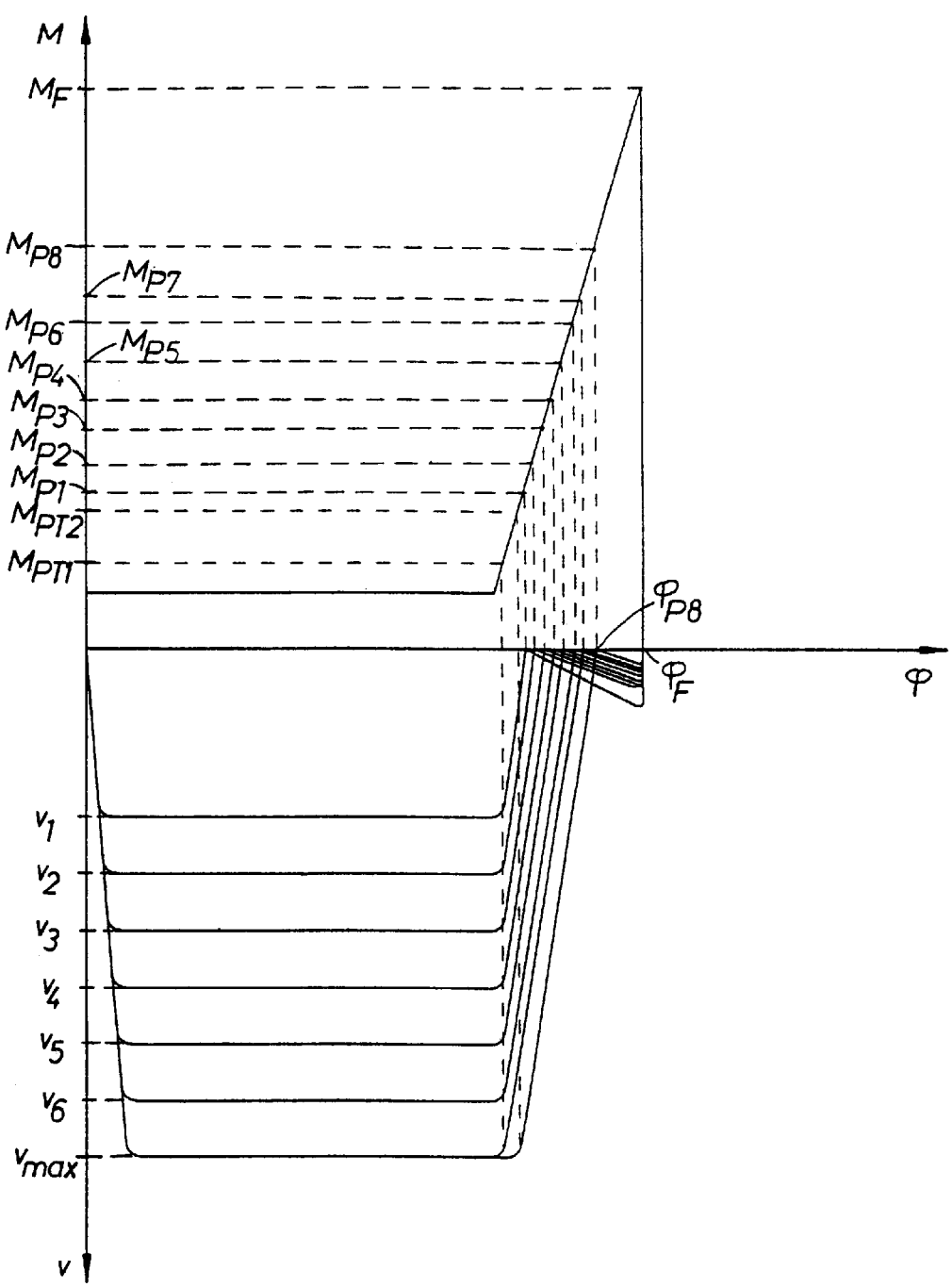
FIG. 2 shows a diagram illustrating the torque/angle characteristic of a relatively stiff type of screw joint, as well as the rotation speed at different programming stages.

When applying the self-programming method according to the invention on a relatively stiff joint, as illustrated in FIG. 2, the strategy chosen by the control system is somewhat different from the strategy used in the above described embodiment.

After an initial very slow tightening process, starting by a first tightening step at the speed $v_1$ and a following acceleration in a second step until the final pretension level $M_F$ is reached, the torque rate or stiffness of the screw joint is detected and calculated. Since the joint, according to the initial detecting and calculating process, has a steep torque angle characteristic, the self-programming strategy will be to increase stepwise the rotation speed during the first tightening step while aiming at the same preliminary target $M_{PT1}$. As illustrated in the diagram in FIG. 2, the initial speed $v_1$ is stepwise increased successively to $v_2$, $v_3$, $v_4$, $v_5$, $v_6$, and finally to $v_{max}$.

During this speed increase, the actually installed torque in the joint is increased from $M_{P1}$ to $MP_2$, $M_{P3}$, $M_{P4}$, $M_{P5}$, $M_{P6}$ and $M_{P7}$. Since the angular positron of the joint corresponding to the installed torque $M_{P7}$ is still not close enough to the desired final angular position $\Phi_F$ and since the rotation speed is not possible to increase any further, the preliminary torque target is increased one step to $M_{PT2}$. This results in an increase of the installed torque to $M_{P8}$, and the obtained angular position of the joint after the first tightening step $\Phi_{P8}$. The resultant distance between this angular position $\Phi_{P8}$ and the aimed final position $\Phi_F$ is acceptably short, which means that the second tightening step and, accordingly, the overall cycle time will be satisfactory short.

At this point, the programming is automatically locked, which means that all subsequent tightening processes on the same type of screw joint will be carried out in the same way, i.e. using the maximum system speed $v_{max}$ up to the preliminary torque target $M_{PT2}$, and completing the tightening process at a low speed up to the desired final pretension level $M_F$. This means that the final angle of rotation to be performed during the second tightening step, namely from the obtained position $\Phi_8$ to the final aimed position $\Phi_F$, is short enough to provide a satisfactory short overall cycle time.

Above there have been described self-programming processes of a power nutrunner control system in two types of screw joints having different torque rates or torque growth characteristics, and there have been described two different strategies chosen by the system itself for obtaining a satisfactory programming. This choice of strategy is made automatically by the system itself after having detected and calculated during the initial low speed processes the torque growth and friction characteristics of the actual type of screw joint. In case of a soft joint, the programming process may be speeded up by stepping us at the same time the rotation speed and the preliminary target torque level. In a case of a stiff torque growth characteristic, the preliminary torque target level is kept constant, at least to begin with, while stepping up the rotation speed to see what value is obtained of the installed torque or the angular position. If the maximum speed of the system does not suffice to reach an acceptable angular position, the preliminary torque target has to be stepped up as well.

In the above examples, torque has been used as a measurement for pretension level of the screw joint, and angular positions of the screw joint have used to deserve the down shift point during tightening. The invention, however, is not limited to the use of these two parameters for governing the process instead of torque, axial load in the screw joint could be used as an indication on the pretension level.

Neither is the invention limited to a tightening process divided into two distinct steps where the rotation is completely stopped between the two steps. The process could as well be performed in two different speed phases where the rotation of the screw joint is not stopped at the down shift point, a momentary speed reduction between the first tightening step and the second step may be enough.

What is claimed is:

1. A method for self-programming a computerized power nutrunner control system for tightening a number of similar screw joints to a desired final torque level ($M_F$), said method comprising:

tightening initially at a low speed one of said screw joints up to said final torque level ($M_t$), while detecting and analyzing one or more screw joint characteristics, adjusting successively during a number of succeeding tightening processes one or more nutrunner operating parameters with respect to said detected and analyzed screw joint characteristics, and locking said self-programming after said nutrunner operating parameters have been adjusted to accomplish a sate tightening of successive ones of said number of similar screw joints to said final torque level ($M_F$) at a satisfactory short time interval.

2. The method according to claim 1, wherein:

screw joint tightening is performed in a two-step process comprising a first tightening step in which tightening is carried out up to a preliminary target torque level ($M_{PT}$) which is considerably lower than said final torque level ($M_F$), and a second tightening step in which said screw joint is tightened from a pretension level ($M_P$) obtained by aiming at said preliminary target torque level to said final torque level ($M_F$), said first tightening step is initially carried out at a low nutrunner speed which is successively increased up to a maximum speed level ($V_{max}$) during a number of succeeding tightening processes to make an actually obtained angular position ($\Phi_{1-5}$) of the screw joint at the end of said first tightening step differ from a final angular position ($\Phi_F$) corresponding to a predetermined fraction of said final torque level ($M_F$).

3. The method according to claim 2, wherein said predetermined fraction is 20%–50% of said final torque level ($M_F$).

4. The method according to claim 3, wherein said successive increase of the nutrunner speed to said maximum speed level ($V_{max}$) is followed by a successive increase of said preliminary target torque level ($M_{pt}$) until the actually obtained angular position ($\Phi_{1-5}$) at the end of said first tightening step differs from said final angular position ($\Phi_F$) by no more than 20%–50%.

5. The method according to claim 4, wherein said one or more screw joint characteristics comprise frictional resistance and torque growth-to-angle of rotation.

6. The method according to claim 3, wherein said one of more screw joint characteristics comprise frictional resistance and torque growth-to-angle of rotation.

7. The method according to claim 2, wherein said successive increase of the nutrunner speed to said maximum speed level ($V_{max}$) is followed by a successive increase of said preliminary target torque level ($M_{pt}$) until the actually obtained angular position ($\Phi_{1-5}$) at the end of said first tightening step differs from said final angular position ($\Phi_F$) by no more than 20%–50%.

8. The method according to claim 7, wherein said one or more screw joint characteristics comprise frictional resistance and torque growth-to-angle of rotation.

9. The method according to claim 2, wherein said one or more screw joint characteristics comprise frictional resistance and torque growth-to-angle of rotation.

10. The method according to claim 1, wherein:

screw joint tightening is performed in a two-step process comprising a first tightening step in which tightening is carried out up to a preliminary target torque level ($M_{pt}$) which is considerably lower than said final torque level ($M_F$), and a second tightening step in which said screw joint is tightened from said preliminary target torque level ($M_{pt}$) to said final torque level ($M_F$), said first tightening step is initially carried out at a low speed which is successively increased up to a maximum speed level ($V_{max}$) during a number of succeeding tightening processes to make an actually obtained pretension value ($M_{p5}$; $M_{p8}$) at the end of said first tightening step amount to a predetermined fraction of said final torque level ($M_F$).

11. The method according to claim 10, wherein said successive increase of the nutrunner speed to said maximum speed level ($V_{max}$) is followed by a successive increase of said preliminary target torque level ($M_{pt}$) until the actually obtained pretension value ($M_P$) reaches said predetermined fraction of said final torque level ($M_F$).

12. The method according to claim 11, wherein said predetermined fraction is 50%–80% of said final torque level ($M_F$).

13. The method according to claim 12, wherein said one or more screw joint characteristics comprise frictional resistance and torque growth-to-angle of rotation.

14. The method according to claim 11, wherein said one or more screw joint characteristics comprise frictional resistance and torque growth-to-angle of rotation.

15. The method according to claim 10, wherein said predetermined fraction is 50%–80% of said final torque level ($M_F$).

16. The method according to claim 15, wherein said one or more screw joint characteristics comprise frictional resistance and torque growth-to-angle of rotation.

17. The method according to claim 10, wherein said one or more screw joint characteristics comprise frictional resistance and torque growth-to-angle of rotation.

18. The method according to claim 1, wherein said detected and analyzed screw joint characteristics are used to determine whether the tightening process should be performed in one step or in two steps.

19. The method according to claim 18, wherein said one or more screw joint characteristics comprise frictional resistance and torque growth-to-angle of rotation.

20. The method according to claim 1, wherein said one or more screw joint characteristics comprise frictional resistance and torque growth-to-angle of rotation.

21. A method for self-programming a computerized power nutrunner control system for tightening a number of similar screw joints to a desired final torque level, said method comprising:

analyzing during an initial tightening process, screw joint characteristics via said control system, and performing during a final part of each one of a number of succeeding tightening processes a number of controlled empirically related changes of two or more system parameters which are evaluated against criteria for running down speed and tightening angle derived from said screw joint characteristics analysis.

* * * * *